(12) United States Patent
FitzPatrick

(10) Patent No.: US 7,303,656 B2
(45) Date of Patent: Dec. 4, 2007

(54) LOW PERMEABILITY TEXTILE SUBSTRATE FOR A TWO-SIDED COATED PRODUCT

(75) Inventor: Keith FitzPatrick, Dieren (NL)

(73) Assignee: Albany International Corp., Albany, NY (US)

( * ) Notice: Subject to any disclaimer, the term of this patent is extended or adjusted under 35 U.S.C. 154(b) by 689 days.

(21) Appl. No.: 10/612,231

(22) Filed: Jul. 2, 2003

(65) Prior Publication Data
US 2005/0086833 A1 Apr. 28, 2005

(51) Int. Cl.
D21F 3/08 (2006.01)
(52) U.S. Cl. .................... 162/358.4; 162/901; 442/304; 28/142
(58) Field of Classification Search ............... 162/116, 162/117, 358.1, 358.2, 358.3, 358.4, 900–904, 162/348, 361, 362; 139/383 A, 425 A; 28/110, 142; 442/304–319, 50–58; 198/844.1, 198/846, 847
See application file for complete search history.

(56) References Cited

U.S. PATENT DOCUMENTS

| | | | |
|---|---|---|---|
| 3,673,023 A | 6/1972 | Ross ......................... 156/137 |
| 3,962,511 A | 6/1976 | Foti .......................... 428/246 |
| 3,998,986 A * | 12/1976 | Williams ................... 428/102 |
| 4,109,543 A | 8/1978 | Foti ........................... 74/231 |
| 4,154,335 A * | 5/1979 | Burnett et al. ............. 198/847 |
| 4,229,253 A | 10/1980 | Cronin ...................... 162/358 |
| 4,229,254 A | 10/1980 | Gill .......................... 162/358 |
| 4,541,895 A | 9/1985 | Albert ....................... 162/348 |
| 4,643,916 A | 2/1987 | Kiuchi ....................... 427/176 |
| 4,787,946 A | 11/1988 | Romanski .................. 156/137 |
| 4,812,185 A | 3/1989 | Romanski .................... 156/86 |
| 4,908,103 A | 3/1990 | Cronin et al. .............. 162/358 |
| 4,944,820 A | 7/1990 | McCarten ................... 156/154 |
| 4,946,731 A | 8/1990 | Dutt .......................... 428/156 |
| 4,948,658 A * | 8/1990 | Halker ....................... 442/314 |
| 5,132,141 A | 7/1992 | Schön ........................ 427/171 |
| 5,196,092 A | 3/1993 | Stigberg ..................... 162/358 |
| 5,208,087 A | 5/1993 | Stigberg ...................... 428/60 |
| 5,238,537 A | 8/1993 | Dutt ........................ 162/358.4 |
| 5,240,531 A | 8/1993 | Toda et al. ................. 156/137 |
| 5,360,656 A | 11/1994 | Rexfelt et al. .............. 428/193 |
| 5,507,899 A | 4/1996 | Watanabe et al. ........... 156/154 |
| 5,525,194 A | 6/1996 | Jermo ..................... 162/358.4 |
| 5,573,813 A | 11/1996 | Custer et al. ............... 427/346 |
| 5,750,151 A | 5/1998 | Brignola et al. ............. 425/66 |
| 5,753,085 A | 5/1998 | FitzPatrick .............. 162/358.4 |
| 5,792,323 A | 8/1998 | Grondahl ................ 162/358.4 |
| 5,833,898 A | 11/1998 | Dutt .......................... 264/102 |

(Continued)

FOREIGN PATENT DOCUMENTS

EP 0 943 730 A 9/1999

(Continued)

Primary Examiner—Eric Hug
(74) Attorney, Agent, or Firm—Frommer Lawrence & Haug LLP; Ronald R. Santucci

(57) ABSTRACT

A laminated substrate or base structure comprising separately formed layers with warp knitted or stitch bonded yarns joining the layers together wherein at least one of the layers is a reinforcing layer and at least one of the layers is for inhibiting resin flow through the substrate. A method for forming the substrate or base structure into a coated papermaker's process belt product is also described.

37 Claims, 3 Drawing Sheets

U.S. PATENT DOCUMENTS

| | | | |
|---|---|---|---|
| 5,891,560 A | 4/1999 | Edwards et al. | 428/295 |
| 5,976,307 A | 11/1999 | Cook, Jr. | 156/344 |
| 6,027,615 A | 2/2000 | Davenport et al. | 162/358.2 |
| 6,030,908 A * | 2/2000 | Baker et al. | 442/402 |
| 6,042,695 A | 3/2000 | Ishino | 162/358.4 |
| 6,086,719 A | 7/2000 | Hasegawa | 162/358.4 |
| 6,099,781 A | 8/2000 | Ampulski | 264/257 |
| 6,294,485 B1 * | 9/2001 | Hodson et al. | 442/85 |
| 6,362,300 B1 | 3/2002 | Araki et al. | 528/28 |
| 6,419,795 B1 | 7/2002 | Dutt | 162/358.4 |
| 6,718,896 B2 * | 4/2004 | Davenport | 114/74 T |

FOREIGN PATENT DOCUMENTS

| | | |
|---|---|---|
| EP | 0 960 975 | * 12/1999 |
| EP | 0 960 975 A | 12/1999 |
| WO | WO95/25200 | 9/1995 |

* cited by examiner

LOW PERMEABILITY TEXTILE SUBSTRATE FOR A TWO-SIDED COATED PRODUCT

BACKGROUND OF THE INVENTION

1. Field of the Invention

The present invention relates to the papermaking arts. More specifically, the present invention relates to a laminated fabric which is warp knitted/stitch bonded together.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Contemporary fabrics are produced in a wide variety of styles designed to meet the requirements of the paper machines on which they are installed for the paper grades being manufactured. Generally, they comprise a woven or other type base fabric. Additionally, as in the case of fabrics used in the press section, the press fabrics have one or more base fabrics into which has been needled a batt of fine, nonwoven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing at least one base fabric within the endless loop formed by another, and by needling a staple fiber batt through these base fabrics to join them to one another as in the case of press fabrics. One or more of these woven base fabrics may be of the on-machine-seamable type. This is now a well known laminated press fabric with a multiple base support structure. In any event, the fabrics are in the form of endless loops, or are seamable into such forms, having a specific length, measured longitudinally there-around, and a specific width, measured transversely there-across.

Traditionally, press sections have included a series of nips formed by pairs of adjacent cylindrical press rolls. In recent years, the use of long nip press nips has been found to be advantageous over the use of nips formed by pairs of adjacent press rolls. This is so because the longer the time a cellulosic fibrous web can be subjected to pressure in the nip, the more water can be removed there, and, consequently, the less water will remain behind in the fibrous web for removal through evaporation in the dryer section.

In this variety of long nip press, the nip is formed between a cylindrical press roll and an arcuate pressure shoe. The latter has a cylindrically concave surface having a radius of curvature close to that of the cylindrical press roll. When the roll and shoe are brought into close physical proximity to one another, a nip, which can be five to ten times longer in the machine direction than one between two press rolls, is formed. This increases the so-called dwell time of applied pressure on the fibrous web in the long nip. The result of this new long nip technology has been a dramatic increase in the dewatering of the fibrous web in the long nip when compared to that obtained with conventional nips on paper machines.

A long nip press of the shoe type requires a special belt, such as that shown in U.S. Pat. No. 5,238,537. Such a belt must be provided with a smooth, impervious surface that rides, or slides, over the stationary shoe on a lubricating film of oil. The belt moves through the nip at roughly the same speed as the press fabric, thereby subjecting the press fabric to minimal amounts of rubbing against the surface of the belt.

Belts of the variety shown in U.S. Pat. No. 5,238,537 are made by impregnating a woven base fabric, which takes the form of an endless loop, with a synthetic polymeric resin. Preferably, the resin forms a coating of some predetermined thickness at least on the inner surface of the belt, so that the yarns from which the base fabric is woven may be protected from direct contact with the arcuate pressure shoe component of the long nip press. It is specifically this coating which must have a smooth, impervious surface to slide readily over the lubricated shoe and to prevent any of the lubricating oil from penetrating the structure of the belt to contaminate the press fabric, or fabrics, and fibrous web.

The base fabric of the belt shown in U.S. Pat. No. 5,238,537 may be woven from monofilament yarns in a single- or multi-layer weave, and is woven so as to be sufficiently open to allow the impregnating material to totally impregnate the weave. This eliminates the possibility of any voids forming in the final belt. Such voids may allow the lubrication used between the belt and shoe to pass through the belt and contaminate the press fabric or fabrics and fibrous web.

When the impregnating material is cured to a solid condition, it is bound to the base fabric by a mechanical interlock, wherein the cured impregnating material surrounds the yarns of the base fabric.

Depending on requirements, there is frequently a need to control the depth to which the impregnating material penetrates within the base fabric. This may be desirable either because only one side of the base fabric is to be coated, or because each side is to be coated in a separate operation.

Heretofore, filler or stuffer yarns have been included in the base fabrics for this purpose. Their use has been only partly successful; despite the inclusion of filler or stuffer yarns, some seepage of the impregnating material through the base fabric invariably occurs in a nonuniform manner. Where the base fabric is only to be coated on one side, this presents at least an aesthetic problem, as the uncoated side of the base fabric ultimately appears blotchy and nonuniform due to uneven penetration by the impregnating material.

Because the cured impregnating material is primarily bound to the base fabric by a mechanical interlock, the impregnating material must penetrate to a depth sufficient to ensure that it will to some extent interlock with the base fabric, and will not delaminate readily therefrom. Where both sides of the base fabric are to be coated in separate operations, the impregnating material on each side must be sufficiently bound to prevent delamination. To ensure such an outcome, the impregnating material on the first side to be coated should penetrate uniformly to a depth enabling it to be mechanically bound to the base fabric, while leaving sufficient unimpregnated structure to enable impregnating material applied to the other side to be mechanically bound thereto. If the impregnating material has penetrated too deeply from the first side, that applied to the other side may have too few interlocking sites and may eventually delaminate.

One approach that has been proposed for overcoming this difficulty is to first coat one side of the base fabric with the impregnating material, and to allow that coating to at least partially cure. Then, after inverting (turning inside out) the base fabric, one applies a tie coat to the other side, followed by a coating of the impregnating material. The tie coat provides an additional chemical bond between the coatings on the two sides of the base fabric. The application of the tie coat, however, represents an extra process step and is difficult to control.

In the case of many applications, including woven fabrics, fabrics produced by spirally winding a strip of woven (see U.S. Pat. No. 5,360,656 to Rexfelt ("Rexfelt '656") or knitted fabric, or laminated fabrics all require some mechanism for either keeping the yarns in place or for joining the fabric together. Typically heretofore needling of staple fiber through a multilayer fabric was utilized to keep it together. Other methods were utilized such as bonding or welding, as taught in EP 0960975.

Placing two or more components together to form a substrate for a paper industry process belt may enhance the belt properties such as providing a better support for the resin coating to penetrate the base and thus prevent delamination of the resin coating layer. It may also control the depth of resin penetration. EP Patent 0960975 attempts to address this issue by producing a substrate comprising two woven base fabrics held together with needled batt like that used in a press fabric. However, the process is costly in terms of material (two separate bases need to be woven), processes (the two bases need to have batt attached by needling), and time needed for each processing step. Other base support substrates for paper industry process belts have been proposed besides woven fabrics. Knitted structures especially have been considered for various reasons. However, no prior art has taught producing a multilayer or multicomponent "laminate," held together by stitch bonding or knitting, which also provides a degree of control of depth of penetration of resin coating as well as an excellent structure to aid resin/substrate interlock.

The present invention provides an approach towards achieving this end.

SUMMARY OF THE INVENTION

The present invention is a fabric made out of a plurality of separately formed layers which are then bound together by warp knitting or stitch bonding. The fabric comprises at least one reinforcing layer and at least one scrim layer.

DETAILED DESCRIPTION OF THE INVENTION

A preferred embodiment of the present invention will be described in the context of a papermaker's process belt. However, the invention may be applicable to other industrial settings that require, for example, coated process belts. The base support structure includes a knitted or stitch bonded component made of monofilament, plied monofilament, multifilament or plied multifilament yarns, and may be single-layered or multi-layered. The yarns are typically extruded from any one of the synthetic polymeric resins, such as polyamide and polyester resins, used for this purpose by those of ordinary skill in the industrial fabric arts.

Figure 1:
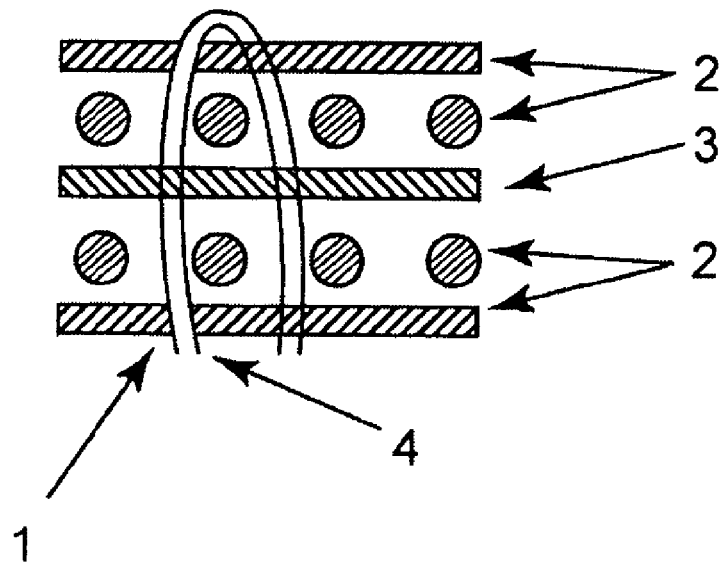
FIG. 1 is a cross-sectional side view of the fabric showing the reinforcing components, nonwoven scrim and warp knitted or stitch bonded binder yarn.

FIG. 1 is a side view of one embodiment of the support structure 1 of the present invention. However preliminary comments are in order. Knitting to form a laminate is known in the textile industry; for example, knitted fabrics are taught as a belt substrate. Further, fabrics having anti-rewet layers are also known. However by using separate components warp knitted or stitch bonded, instead of woven together, the present invention is a distinct alternative to conventional fabrics. In further contrast to prior art fabrics, the invention is of a laminated substrate or base structure whereby the reinforcing or load bearing components of the structure are separated by a layer that prevents resin flow all the way through the structure. This laminated preassembly is held together by warp knitting or stitch bonding, and subsequently stored as rolled flat fabric. Note that while this is a laminate, the separating layer or scrim is actually fed into a knitting or stitch bonding machine to produce the "laminate." This subassembly can also be spiraled together using the technique later described.

Referring now more particularly to FIG. 1, support structure 1 of the present invention includes reinforcing layers 2 and nonwoven scrim 3 which are warp knitted or stitched bonded together via binder yarn(s) 4. Positioned between the reinforcing components 2 is a preformed nonwoven scrim layer 3. Reinforcing components 2 are typically multifilament or monofilament yarns. Scrim component 3 is typically of a spun bonded, wet laid or air laid construction or can be an extruded mesh, or an extruded or cast porous or nonporous film.

Figure 3:
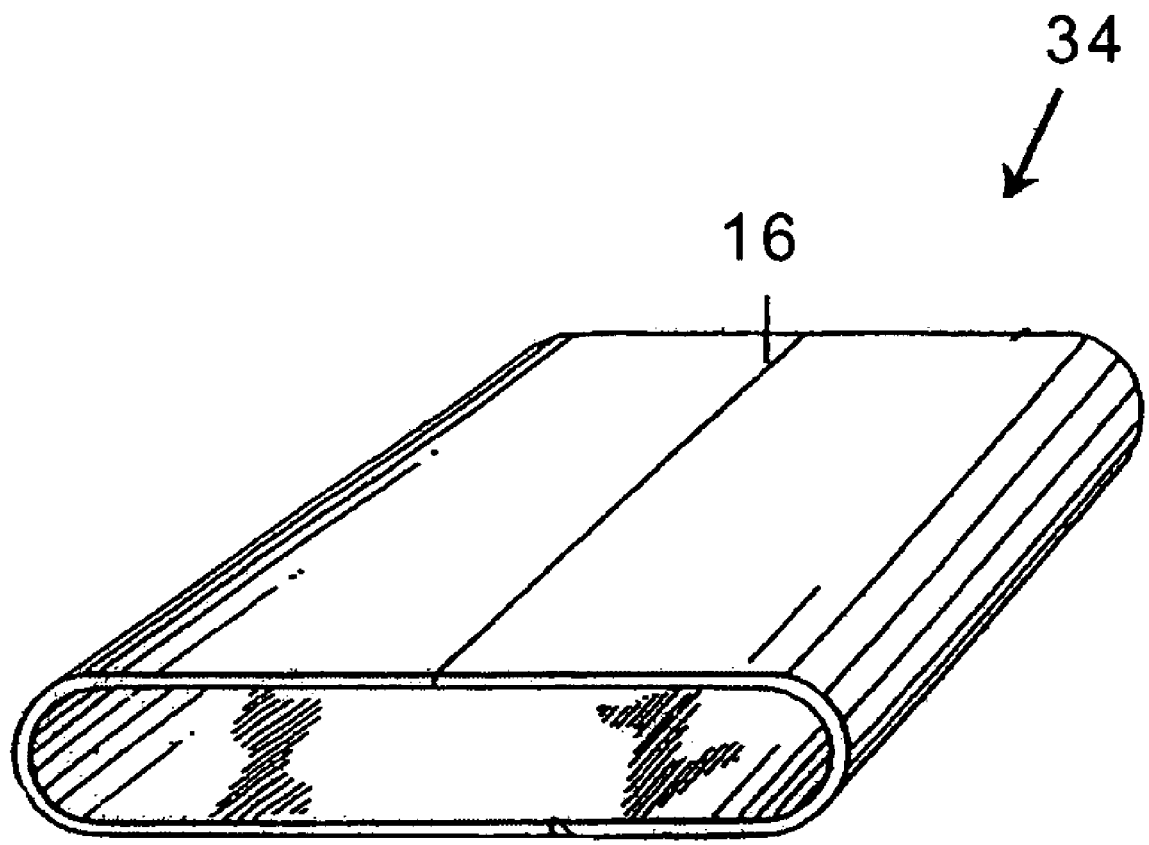
FIG. 3 is an spirally wound fabric according to the present invention.

Support structure 1 of the present invention provides the advantage in that scrim 3 may be selected having low permeability to the penetration of, for example, polymeric resin or rubber coatings to be applied to one or both sides of support structure 1. This allows separate resin coatings with different properties to be applied to different fabric sides if and when desired, overcoming the problem of bleed-through encountered with more conventional prior art support structures. Accordingly, the degree of penetration of the coating and its position within support structure 1 may be predetermined; that is, the permeability to fluid of support structure 1 is controlled using scrim component 3. It is a further advantage that materials constituting scrim 3, binder yarns 4, and reinforcing components 2 may be selected based on their adhesive affinity for the coatings applied to support structure 1. Typically, support structure 1 may be subsequently rolled up in a strip for future use. When necessary, this strip material is unrolled and can then be joined endless using a spiral winding technique like that disclosed in U.S. Pat. No. 5,360,656 ("Rexfelt '656") the disclosure of which is incorporated herein by reference. For example, support structure 1 and/or its component layers 2, 3 need not be a full width structure but can be a strip 34 of material such as that disclosed in Rexfelt '656 and subsequently formed into a full width structure 16 as shown in FIG. 3. The strip 34 can be unwound and wound up on a set of rolls after fully processing. These rolls of strip materials can be stored and can then be used to form an endless full width structure 16 using, for example, the teachings of the immediately aforementioned patent. Or, the material strip can be spirally wound upon a mandrel prior to coating. The mandrel can have a layer of polymeric resin or rubber coating already applied to its surface.

Figure 2:
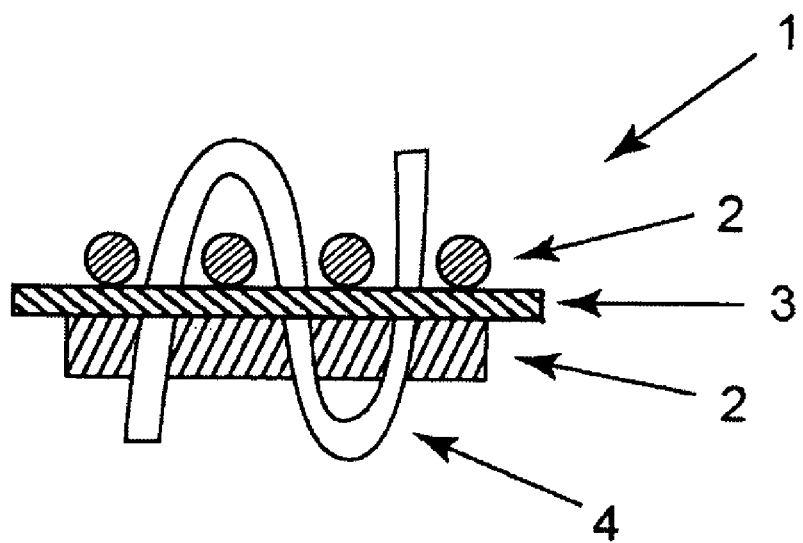
FIG. 2 is a cross-sectional side view of the fabric showing the reinforcing components, nonwoven scrim and warp knitted or stitch bonded yarn loop.

FIG. 2 is a side view of an alternative embodiment of the invention. This embodiment provides a further advantage in that the warp knitted/stitch bonded yarns provide additional bonding points for improved polymeric or rubber coating adhesion and structural integrity. More specifically, support structure 1 includes reinforcing layers 2 and nonwoven scrim 3 which are warp knitted or stitched bonded together via binder yarn(s) 4. Note that warp knitted/stitch bonded yarns 4 form a matrix of loops and voids on the surface of support structure 1 providing mechanical bonding points to anchor the polymeric or rubber coating to the support structure 1. As yet a further advantage, dimensional stability of support structure 1 is imparted using the reinforcing matrix of yarns 4 together with the nonwoven scrim 3. As with the previous embodiment, some or all of the components 2, 3, 4 of support structure 1 may have an adhesive affinity for the coatings to be applied to the support structure face and/or both sides.

Further processing, such as buffing or grinding the surfaces for planarity and smoothness can be done. Also, grooves and/or blind drilled holes are put into the nonshoe side surface of the belt to aid water removal.

Figure 4:
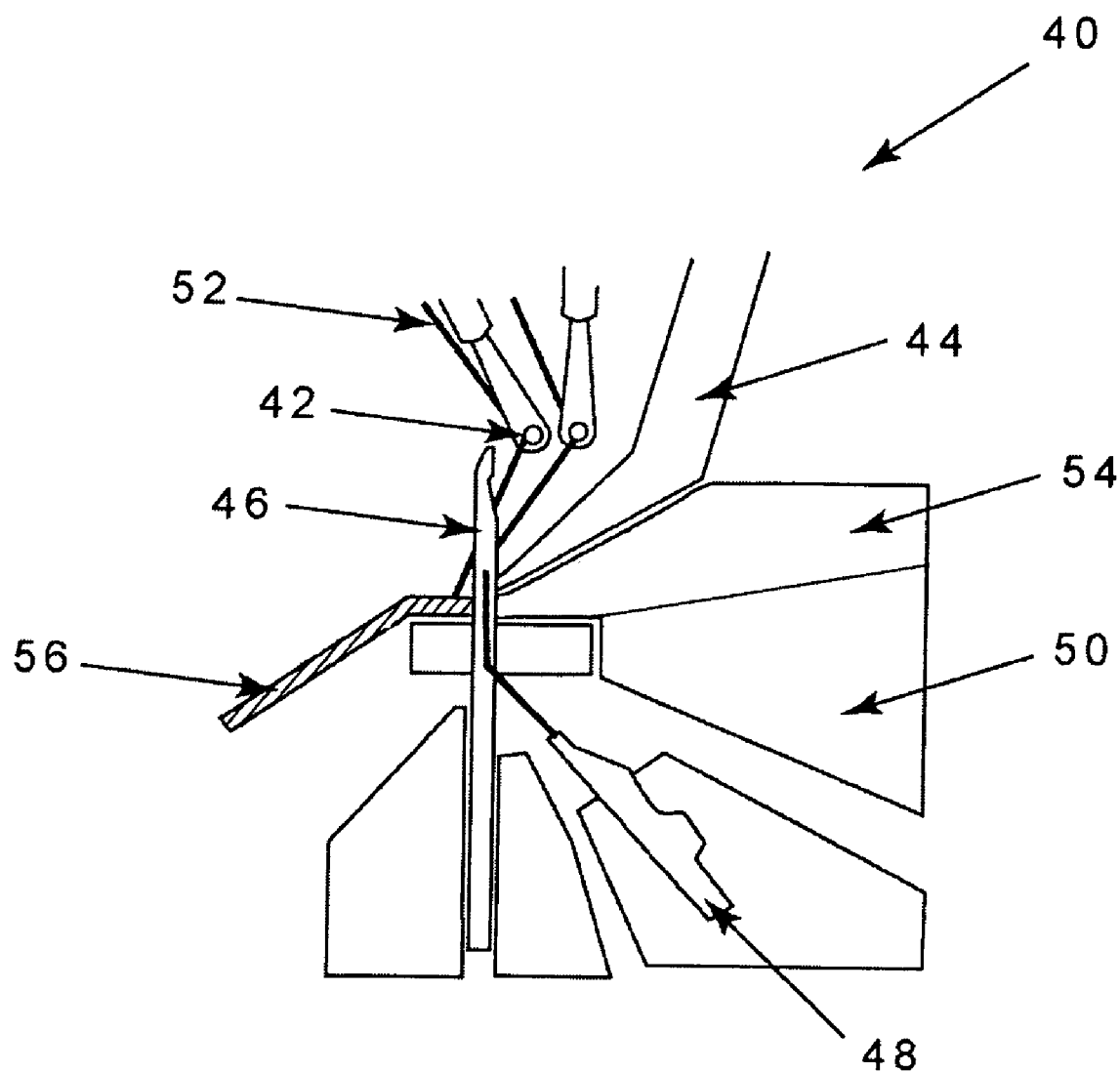
FIG. 4 is a cross-sectional side view of a machine useable to stitch bond fabric according to the invention.

FIG. 4 is a partial view of a high speed Raschel machine, model Racop 2 K-V manufactured by LIBA Maschinenfabrik GmbH, useable for the production of stitch bonded fabric according to the present invention. Shown in FIG. 4 are the some of the machine 40 components including guide bars 42, a moveable or rigidly arranged sinker bar 44, a needle bar with a short stroke compound needle 46, a closure bar 48, and a rigidly arranged trick sinker bar 50. Also shown in FIG. 4 are the knitting thread 52, the fabric 54 being fed into the machine 40, and the stitch bonded fabric 56. The machine 40 is characterised, in particular, by a high production speed, achieved in part by the short stroke compound needle 46 and the crank shaft system (not shown). It is noted that all knitting elements shown in FIG. 4 are easily accessible from the operating side of the machine 40. It is further noted that the stitch bonding method illustrated in FIG. 4 offers several advantages compared with other methods such as thermal laminating to process fabrics 54. For example, the textile characteristics of the fabrics 54 such as elasticity and voluminous quality (void volume) are not adversely affected. Further, in contrast to thermal methods, less energy is consumed.

Modifications to the above would be obvious to one of ordinary skill in the art, but would not bring the invention so modified beyond the scope of the appended claims.

I claim:

1. A method of forming an industrial fabric comprising the steps of:
   providing a laminated substrate or base structure formed by forming separately a number of layers;
   joining the layers together by warp knitted or stitch bonded binder yarns, wherein at least one of the layers is a reinforcing layer and at least one of the layers is a layer for inhibiting flow-through of coatings to be applied to one or both sides of the substrate or base structure; and
   using the substrate or base structure as the support structure of the industrial fabric.

2. The method of claim 1, wherein at least two of the layers are reinforcing layers separated by a layer for inhibiting flow-through of coatings to be applied to one or both sides of the substrate or base structure.

3. The method of claim 1, wherein the binder yarns form a matrix of loops above a surface of the substrate or base structure and serve as bonding points for anchoring the coatings applied thereto.

4. The method of claim 1, wherein at least one of the layers and binder yarns has an adhesive affinity for at least one of the coatings.

5. The method of claim 3, wherein the matrix of yarn loops improves the structural stability of the substrate or base structure.

6. The method of claim 1, including the step of coating only one side of the substrate or base structure.

7. The method of claim 1, including the step of coating both sides of the substrate or base structure.

8. The method of claim 1, including the step of coating both sides of the substrate or base structure with the same coating.

9. The method of claim 1, including the step of coating at least one side of the substrate or base structure with a rubber coating.

10. The method of claim 1, including the step of coating the substrate or base structure on a first side thereof with a first polymer type and coating a second side thereof with a second polymer different than the first polymer.

11. The method of claim 1, including the step of forming the substrate or base structure in strips of material which are ultimately spiral wound to form a base support structure having a width greater than a width of the strips.

12. The method of any of claims 6, 7, 8, 9 and 10, comprising the further step of forming a plurality of grooves on the surface of the coated substrate or base structure.

13. The method of any of claims 6, 7, 8, 9 and 10, comprising the further step of forming a plurality of blind drilled holes on the surface of the coated substrate or base structure.

14. The method of claim 1, including the step of using the substrate or base structure as the support structure of a long nip press or other papermaking belt.

15. The method of claim 1, wherein at least one reinforcing layer comprises multi-filament or monofilament yarns.

16. The method of claim 1, wherein the flow-inhibiting layer is made by one of spun bonded, wet laid and air laid processes.

17. The method of claim 1, wherein the flow-inhibiting layer is a nonwoven scrim, extruded mesh, or extruded or cast porous or nonporous film.

18. The method of claim 1, wherein the coating to be applied to the substrate or base structure is polymeric or rubber.

19. An industrial fabric comprising a laminated substrate or base structure, said laminated substrate or base structure comprising: a number of separately formed layers;
    said layers joined together by warp knitted or stitch bonded yarns; wherein at least one of the layers is a reinforcing layer and at least one of the layers is a layer for inhibiting flow-through of coatings to be applied to one or both sides of the substrate or base structure, wherein the substrate or base structure is the support structure of the industrial fabric.

20. The fabric of claim 19, wherein at least two of the layers are reinforcing layers separated by a layer for inhibiting flow-through of coatings to be applied to one or both sides of the substrate or base structure.

21. The fabric of claim 19, wherein the binder yarns form a matrix of ioops above a surface of said substrate or base structure and serve as bonding points for anchoring the coatings to said substrate or base structure.

22. The fabric of claim 19, wherein at least one of the layers and binder yarns has an adhesive affinity for at least one of the coatings.

23. The fabric of claim 21, wherein the matrix of yarn loops improves the structural integrity thereof.

24. The fabric of claim 19, wherein only one side of the substrate or base structure is coated.

25. The fabric of claim 19, wherein both sides of the substrate or base structure are coated.

26. The fabric of claim 19, wherein both sides of the substrate or base structure are coated with the same coating.

27. The fabric of claim 19, wherein the substrate or base structure is coated on a first side with a first polymeric type and coated on a second side with a second polymer different than the first polymer.

28. The fabric of claim 19, wherein the substrate or base structure is formed in strips of material which are ultimately spiral wound to form a base support structure having a width greater than a width of the strips.

29. The fabric according to any of claims 24, 25, 26 and 27, wherein the surface thereof includes a plurality of grooves.

30. The fabric according to any of claims 24, 25, 26 and 27, wherein a surface thereof includes a plurality of blind holes.

31. The fabric of claim 19, wherein the substrate or base structure is the support structure of a long nip press or other papermaking belt.

32. The fabric of claim 19, wherein at least one reinforcing layer comprises multifilament or monofilament yarns.

33. The fabric of claim 19, wherein the flow-inhibiting layer is made by one of spun bonded, wet laid and air laid processes.

34. The fabric of claim 19, wherein the flow-inhibiting layer is a nonwoven scrim, extruded mesh, or extruded or cast porous or nonporous film.

35. The fabric of claim 19, wherein the resin to be applied to the substrate or base structure is polymeric or a rubber like compound.

36. A method of forming an industrial fabric comprising the steps of:
    providing a laminated substrate or base structure formed by forming separately a number of layers;
    joining the layers together by warp knitted or stitch bonded binder yarns, wherein at least one of the layers is a reinforcing layer and at least one of the layers is a layer for inhibiting flow-through of coatings applied to one or both surfaces of the substrate or base structure; and
    forming a plurality of grooves or blind drilled holes on the surface of the coated substrate or base structure.

37. An industrial fabric comprising a laminated substrate or base structure, said laminated substrate or base structure comprising: a number of separately formed layers; said layers joined together by warp knitted or stitch bonded yarns; wherein at least one of the layers is a reinforcing layer and at least one of the layers is a layer for inhibiting flow-through of coatings to be applied to one or both surfaces of the substrate or base structure, wherein the surface thereof includes a plurality of grooves or blind drilled holes.

* * * * *